US012215570B2

United States Patent
Liagov et al.

(10) Patent No.: US 12,215,570 B2
(45) Date of Patent: Feb. 4, 2025

(54) METHOD OF DRILLING STRING ASSEMBLY FOR SECONDARY OPENING OF A PRODUCTIVE FORMATION

(71) Applicants: Ilia Liagov, Ufa (RU); Alexandr Lyagov, Ufa (RU); Marina Kachemayeva, Ufa (RU)

(72) Inventors: Ilia Liagov, Ufa (RU); Alexandr Lyagov, Ufa (RU); Marina Kachemayeva, Ufa (RU)

( * ) Notice: Subject to any disclaimer, the term of this patent is extended or adjusted under 35 U.S.C. 154(b) by 481 days.

(21) Appl. No.: 17/530,605

(22) Filed: Nov. 19, 2021

(65) Prior Publication Data

US 2022/0074284 A1    Mar. 10, 2022

Related U.S. Application Data

(63) Continuation of application No. PCT/RU2019/000759, filed on Oct. 22, 2019.

(51) Int. Cl.
*E21B 41/00* (2006.01)
*G01M 5/00* (2006.01)

(52) U.S. Cl.
CPC ........... *E21B 41/00* (2013.01); *G01M 5/0025* (2013.01); *G01M 5/0066* (2013.01); *E21B 2200/20* (2020.05)

(58) Field of Classification Search
CPC .... E21B 7/24; E21B 2200/20; G01M 5/0025; G01M 5/0058; G01M 5/0066; G01M 1/14–28
See application file for complete search history.

(56) References Cited

U.S. PATENT DOCUMENTS

2011/0186353 A1* 8/2011 Turner ................ E21B 44/00 703/2
2018/0371889 A1* 12/2018 Hohl ................... E21B 44/00

FOREIGN PATENT DOCUMENTS

CN          203287174 U    11/2013
RU          2147669 C1     4/2000

OTHER PUBLICATIONS

Lin, T., Zhang, Q., Lian, Z., Xiao, Z., Wang, T., Li, G., & Ding, J. (2018). Experimental study on vibrational behaviors of horizontal drillstring. Journal of Petroleum Science and Engineering, 164, 311-319. (Year: 2018).*
Knuzina L.B., Promyslovye ispytaniya komponovki niza burilnoi kolonny s usilennoi dinamicheskoi nagruzkoi na dolot. Territoriya neftegaz. No. Dec. 12, 2016, 5 pages, Russian Federation.

* cited by examiner

*Primary Examiner* — Son T Le
*Assistant Examiner* — Brian Butler Geiss

(57) ABSTRACT

A method of a drilling string assembly for drilling small-diameter branched channels, including installation of operating elements arranged in a dynamically perturbed section of a loaded part of the drilling string. Moreover, a drilling string assembly, comprising oscillators arranged as coupled oscillators, a bit, a spindle section of a bottom-hole motor, power sections of a screw bottom-hole motor, assemblies of rigid and flexible pipes, as well as a device for regulating the axial load, are installed on a test bench. Bench tests are carried out according to modelled programs of possible emergency or non-emergency operating modes of the assembly, both as a whole and of the separate elements.

5 Claims, 7 Drawing Sheets

METHOD OF DRILLING STRING ASSEMBLY FOR SECONDARY OPENING OF A PRODUCTIVE FORMATION

CROSS REFERENCE TO RELATED APPLICATIONS

The present application claims priority to International Application No. PCT/RU2019/000759, filed on Oct. 22, 2019, entitled "Method of drilling string assembly for secondary opening of a productive formation" which is incorporated by reference herein in its entirety.

TECHNICAL FIELD

This technical solution relates to the area of borehole drilling and may be used for borehole workover by means of deep perforation with multiple branches of ultra-small diameter and radius of curvature in drastically varying geological setting.

BACKGROUND

The prior art discloses methods of drill string assemblies (DSA) when drilling with mud motors (MM) including a bottom hole assembly made of steel drill pipes (SDP), drill collars (DC), lightweight drill pipes (LWDP), which have become widely used for deep well drilling in sharply varying boring conditions. [1, 2, 3, 4].

The detrimental feature of the known art is the necessity to calculate and select the length, quantity and place of installation of SDP, LWDP and DC for each particular setting to eliminate the effect of random factors on the assembly efficiency [5, 6], and the unavailability for drilling ultra-small curvature radius channels due to high bending stiffness of the assemblies.

There are other known bottom hole assembly methods, including a drill bit, an MM, centralizers mounted as part of the assembly, which depend on the different natural frequencies of LWDP and DC and further SDP string [7, 8].

However, the assemblies according to these methods are efficient only in particular settings (for example, the wellbore profile with low deviation angle about 2° is stabilized). However, random factors (load, rock drillability and anisotropy, mud rheology, etc.) reduce the assembly efficiency, and sometimes prevent the successful wellbore drilling at required parameters and the implementation of various oscillation regimes.

The closest technical solution to the claimed one is a method for bottom hole assembly that enhances the assembly efficiency due to the reduction of random factors effect on the bottom hole assembly operation in sharply varying drilling settings, but only the longitudinal and usually ground-induced vibrations of the drill bit are considered.

For this purpose, the bottom hole assembly is made of such operating elements as drill pipes, DCs, LWDPs and other operating elements with natural vibration frequencies inter-related as a series of random numbers where the number of terms is limited to the length of the dynamic disturbance part of the compressed part of the drill string by the elastic compression waves in the set drill mode [9].

The length of the dynamic disturbance part of the compressed section of the drill string, which characterizes the energy of the elastic compression waves that affects the assembly reliability, is determined using a known formula [10, 11, 12]

$$L_d = a \cdot t,$$

where $a=5100$ m/sec is the velocity of the longitudinal wave propagation in the drill string;
$t=T/2$ is the time point of maximum dynamic disturbance;
$T=2\pi/\omega$ is the period of longitudinal vibrations of the drill bit, with the angular frequency $\omega$,
$\omega = \omega_2 \cdot K_W \cdot K_c$, where $\omega_2 = \pi \cdot n/30$ is the drill bit angular (circular) frequency for the mud motor rotations number n; $K_W$ is an empirical coefficient; $K_c$ is the number of the drill but cutters.

In the drilling process, the bottom hole assembly made according to the proposed method of the elements with the natural vibration frequency corresponding to the random numbers distribution, shall have lower effect on the mechanical speed of drilling under stochastic oscillations manifesting as random loads, and lower effect on the drill bit, mud motor and drill pipes operability and the curvature of the angled section, i.e. shall ensure vibrational stability of the DSA.

However, the assemblies according to the known method are efficient only for drilling large diameter bores where the prevailing effect is caused by longitudinal vibrations characterized by the propagation of the elastic waves of compression, which run along the steel strings with the sonic speed: $S_s \approx 5100$ m/sec, in lightweight drill pipes (LWDP): $S_l \approx 5040$ m/sec, waves in the fluid column: $S_f \approx 0.1200 \ldots 1350$ m/sec.

With that, the internal damping of the pipes is not considered, and neither is the steel grade or the friction of the DSA against the borehole walls, which is characterized by the complex velocity of waves $S_\eta = \sqrt{E \cdot \rho^{-1}(1+i\eta)}$, where $\eta$ is the tangent of the phase angle between the disturbing force and the displacement; and $\rho$ is the pipe density of the material.

The energy spent on torsional vibrations of the DSA is characterized by the speed of the torsional vibrations propagation: $S_T = \sqrt{G \cdot \rho^{-1}}$ Transverse vibration propagating with the speed:

$$S_{trsv} = \sqrt{\frac{G}{\rho}},$$

for example: with the Poisson ratio 0.25, $$S_{trsv} \approx \frac{G}{\sqrt{3}}$$

Flexural waves $S_{fl}$ and Rayleigh surface waves are:

$$S_R = 0.9194 \cdot S_{trsv} = 0.9194 \sqrt{\frac{G}{\rho}},$$

with the following relation:

$$0 \leq \frac{S_{fl}}{S_R} \leq \frac{1}{\sqrt{2}}$$

SUMMARY OF THE INVENTION

It is desired that the proposed technical solution resolved the issue of improving the assembly efficiency for drilling long bores of small diameter and small curvature radius with a set path in sharply varying drilling conditions.

The technical result of the claimed technical solution is the improvement of the fail safety for the bottom drill string elements when drilling angled and horizontal parts of long bores of small diameter and small curvature radius with pronounced rock alternation requiring drilling mode variations and viscoelastic mechanical properties of the assembly to reduce the probability of sticking due to pressure drop, tool lock-in, channel narrowing due to rock fatigue bulging and due to inadequate borehole cleaning under longitudinal, transverse and torsional stochastic (random) vibrations.

The claimed technical result is achieved by the assembly of the drill string as a technical dynamic system of connected oscillators, for the purpose of drilling branched channels of small diameter, including the assembly of operating elements of different natural frequencies placed in a dynamic disturbance zone of the loaded part of the drill string; the drill string assembly is mounted on a test bench, including the oscillators positioned as connected units, a drill bit, a bearing section of the mud motor, power sections of the mud motor, coiled and rigid tubing assemblies with viscoelastic properties and different natural frequencies, and an axial thrust control unit; the tests are conducted following model programs of possible emergency and emergency-free operation modes for the assembly as a whole and its individual components; measurements are made to obtain amplitude, vibration speed and vibration acceleration of longitudinal, transverse and torsional oscillations of the assembly for drilling each of the rock types, summarized wave motion trends for oscillators moving the common group speed; the obtained values are processed to determine the steady motion place at the test bench; trends for displacement amplitudes, vibration speed and vibration acceleration of the longitudinal, transverse and torsional oscillations are determined for the test bench drilling process; the obtained results are processed by spectral analysis, by calculating the spectral density of the operating elements within the assembly, and the motion trajectories of the operating elements positioned in the dynamic disturbance area of DSA in the phase plane are obtained, also the length of the dynamic disturbance zone of the loaded part of the drill string is determined based on the group velocity of the energy propagation for the monochromatic longitudinal, transverse and torsional waves batch, where waves differ in phase and frequency and propagate along the string with prevailing natural frequencies, different phase velocities at linear and nonlinear, stochastic oscillations that appear in the drill string due to running out of the formed "dynamic stability points"; an axial thrust control unit is additionally placed in the dynamic stability points and is adapted to work at various damping coefficients; its prevailing natural frequency is obtained after statistical analysis of the dynagraphs of the spectral density and phase trajectories; the required mode of operation is selected for the assembly and its operating elements; natural frequencies considering different bending and torsional stiffness values, damping properties of the axial thrust control units and their optimum placement.

A particular embodiment of the claimed technical solution includes calculating the group velocity as a mathematical expectation of the obtained phase velocity values, where the weighing factor is the probability of the rate of such values registration while the assembly is tested on the bench, and the mean value of the corresponding velocity as a random variable shall be equal to the sum of products of the random value and the probability of its occurrence divided by their number;

A particular embodiment of the claimed technical solution includes calculating of the group velocity as a geometric mean of the phase velocities of the longitudinal, transverse and torsional vibrations measured at the bench, A particular embodiment of the claimed technical solution includes calculating the group velocity as an arithmetic mean, for a small difference in disturbing frequencies or for ungrouped data A particular embodiment of the claimed technical solution includes the test bench equipped with amplitude, vibration speed and vibration acceleration gauges for longitudinal, transverse and torsional vibrations of the assemblies when drilling rocks of various strength selected from the following: lime, dolomite, granite, marble or lime-cement block made according to API 19B.

BRIEF DESCRIPTION OF THE DRAWINGS

Details, characteristics and benefits of the technical solution result from the following description of the variants of the technical solution implementation using figures, which show.

Figure 4:
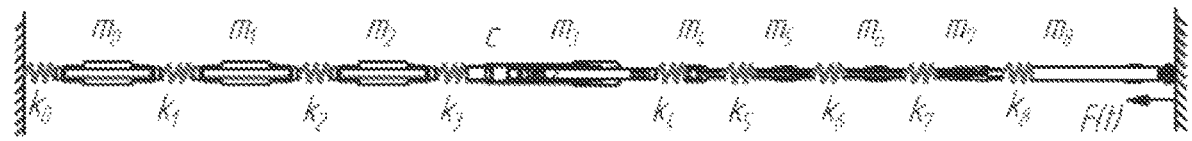
FIG. 4: general layout of the eight-mass tool assembly for drilling deep branched channels of ultra-small diameter and curvature radius.

Following items are indicated in the figures with numbers:
1—perforation drill body with DSA placed within, see FIG. 4; 2—whipstock, 3—power section of the mud motor; 4—mandrel with centralizer; S—drill bit; 6—perforation channel; 7—artificial sand-cement block; 8—receiver; 9—actuator of the drive loader screw; 10—drive-screw; 11—low pressure mud drainage pipe; 12—pump flow line; 13—triplex plunger pump unit SIN 46 with variable frequency drive pump; 14—pressure compensator; 15, 19—control and measuring instruments (sensors); 16—axial thrust control unit for drill bit; 17—high pressure line; 18 process fluid container; 19—amplitude modulation; 20—ω-line; 21—(ω+ε)—line; 22—(ω−ε)-line;

Following items are also indicated in the figures with letters:

A is the amplitudes of individual harmonics with close frequencies;

2A is the maximum amplitude value of two harmonics for the phenomenon of beating;

3A is the maximum amplitude value of three harmonics for the phenomenon of beating;

$m_2, \ldots, m_8$ are lumped masses (oscillators) included in the stochastic vibrations when drilling certain types of rock; $k_0, \ldots, k_8$ are dynamic rigidities of units within a multimass assembly for perforation drilling; $S_4$ is the spectral plane;

DETAILED DESCRIPTION

A method for drill string assembly as a dynamic technical system of connected oscillators, for drilling branched channels of small diameter, including operating elements assembly consisting of a drill bit, a small mud motor, flexible and rigid pipes of various natural frequencies, all positioned in a dynamic disturbance zone of the loaded part of the drill string. Length of the dynamic disturbance zone of the loaded part of the drill string is determined based on the group velocity of the energy propagation for the monochromatic longitudinal, transverse and torsional waves batch.

The group velocity is calculated as a weighted mean, i.e. as a mathematical expectation of the obtained phase speed values, where the weighing factor is the probability of the rate of such values occurrence while the DSA is tested on the bench, and the mean value of the corresponding velocity as a random variable shall be equal to the sum of products of the random value and the probability of its occurrence; or as a geometric mean of the phase velocities of the longitudinal, transverse and torsional vibrations measured at the bench; or as an arithmetic mean, for a small difference in disturbing frequencies or for ungrouped data.

That considered, the assembly of the operating elements with selected natural frequencies is made considering the different bending and torsional stiffness values, and the damping properties of the assembly are enhanced as needed by adding axial thrust control units with varying damping coefficient in the "dynamic stability points", which are determined at the bench after the analysis of the experimental phase trajectories.

Figure 1:
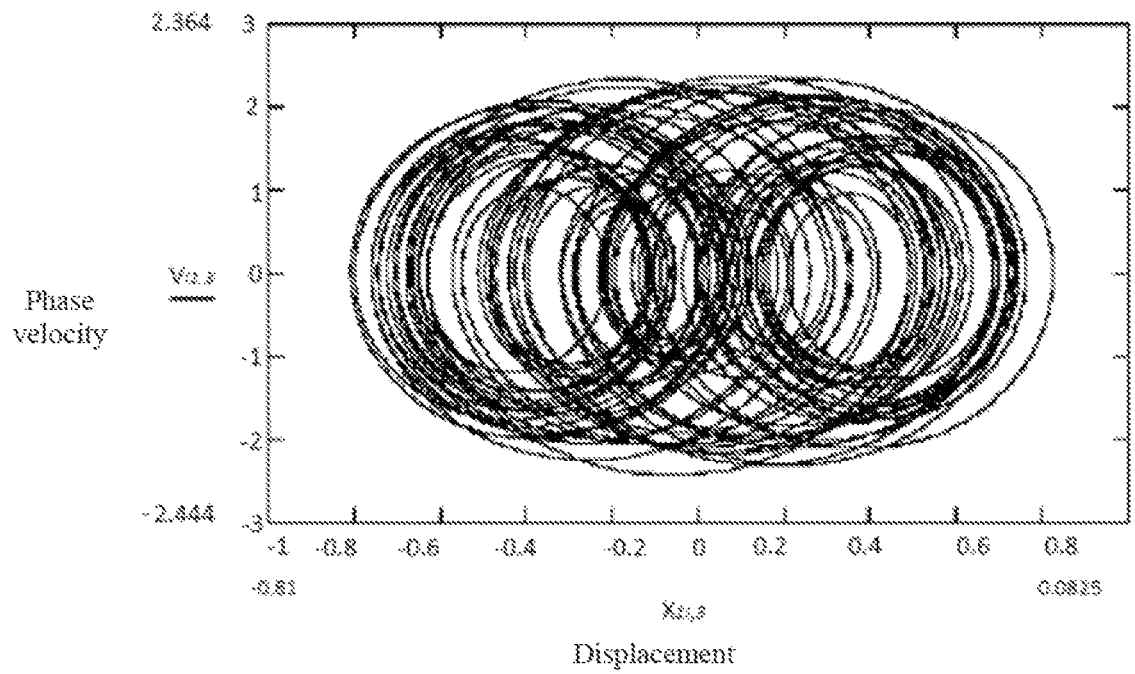
FIG. 1: phase trajectory of the DSA of the multimass oscillation system with the dynamic disturbance part 14 metres long and two dynamic stability points.

The length of the dynamic disturbance zone of the drill string Ld as a technical dynamic system is determined with a known equation using group velocity $v_g$ of the propagation of monochromatic longitudinal, transverse and torsional waves batch different in phase and frequency and propagating along the assembly with different phase speeds $v_{ph}$ under linear and non-linear stochastic vibrations, occurring in a drilling assembly operating in a curved drilled channel, and the stochastic quality of the resulting motion are determined by random disturbances characterized by complex phase trajectory with a framework of a technical dynamic system (total of the state of equilibrium of periodic motion), shown in FIG. 1.

$$Ld = v_g \cdot t.$$

where $v_g$ is a group velocity of the wave batch energy propagation, where wave numbers K are close to the obtained and assessed optimum velocity values for the test bench [13];

$$K = \frac{2 \cdot \pi}{\lambda} = \frac{2 \cdot \pi \cdot f}{v_{PH}} = \frac{\omega}{v_{PH}}$$

where $\lambda$ is the wave length; $f$ is the vibration frequency; $\omega$ is the circular frequency.

$t = T/2$ is the time point of the maximum dynamic disturbance:

$$T = \frac{2 \cdot \pi}{\varepsilon}$$

is the period of DSA vibrations at amplitude modulation with circular frequency $\varepsilon$.

Figure 2:
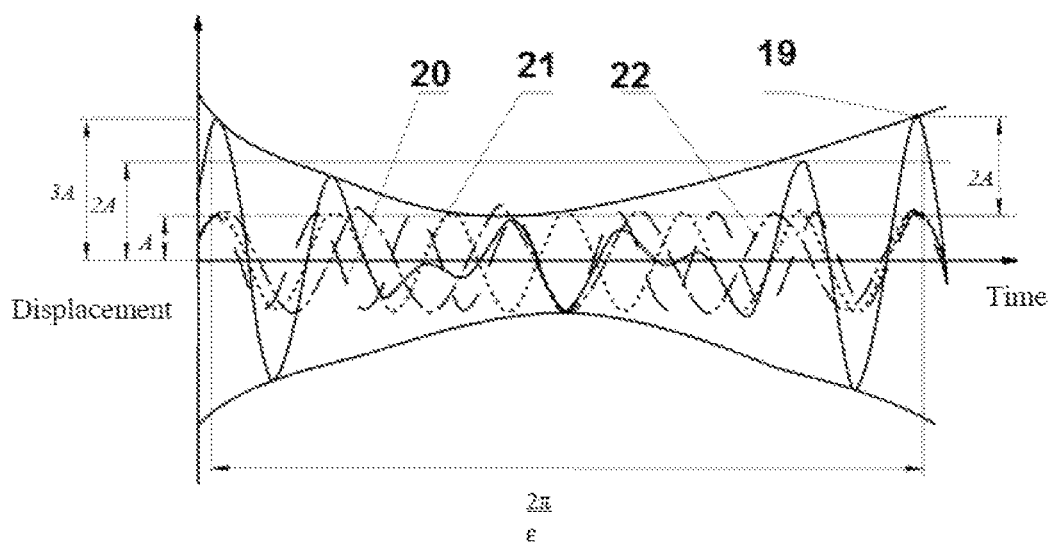
FIG. 2: amplitude modulation.

The amplitude modulation (resulting motion) (19) with variable amplitude $A \cdot (1 + 2 \cdot \cos(\varepsilon \cdot t))$ and circular frequency $\varepsilon$ and quasiperiod $$\frac{2\pi}{\varepsilon}$$

of three vibrations of various frequencies $\omega$-line (20), ($\omega$+$\varepsilon$)-line 21 and ($\omega$−$\varepsilon$)-line 22 is shown in FIG. 2.

Then the law of motion with carrier frequency $\omega$ shall be as follows:

$$X(t) = \sum_{i=1}^{3} X_i = A \cdot \sin(\omega \cdot t) + A \cdot \sin((\omega + \varepsilon) \cdot t) + A \cdot \sin((\omega - \varepsilon) \cdot t) =$$
$$A \cdot [1 + 2 \cdot \cos(\varepsilon \cdot t)] \cdot \sin(\omega \cdot t).$$

Figure 3:
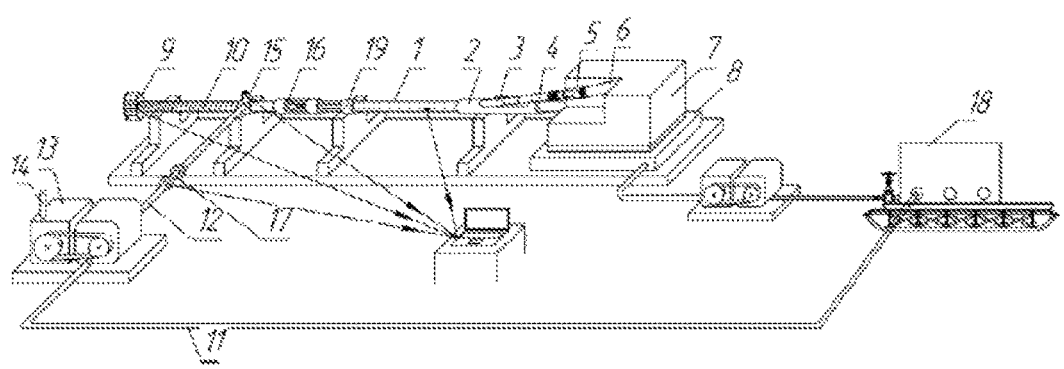
FIG. 3: test bench.

A test assembly for drilling deep branched channels of ultra-small diameter and radius of curvature is made and mounted on a test bench, see layout in FIG. 3. The assembly includes a drill bit (mill) (5), a bearing section of the mud motor (4), power sections of the mud motor (3), viscoelastic coiled tubing assemblies with different natural frequencies, placed inside a body (1); and an axial thrust control unit (16). Layout of the assembly placed in a perforation drill body (1) is shown in FIG. 4.

The bench is equipped with amplitude (displacement), vibration speed and vibration acceleration gauges for longitudinal, transverse and torsional vibrations of the DSA/BHA for drilling rocks of various strength 7 (such as: lime, dolomite, granite, marble or lime-cement block made according to API 19B).

FIG. 4 shows the general layout of the eight-mass tool assembly for drilling deep branched channels of ultra-small diameter and curvature radius.

For example: for drilling a 14 m long, 58 mm diameter channel the DSA shall consist of $m_0, m_1, m_2, \ldots, m_8$ lumped masses (oscillators) involved in stochastic vibrations when drilling a particular type of rock (where $m_0, m_1, m_2, m_4, m_5, m_6, m_7$ are the weights of the operating elements of the assembly);

$m_0 \ldots m_2$ are the weight of the rigid tubing, 43 mm diameter, 4.5 mm wall thickness, total length 10 m, weight 4.3 kg per 1 m, where G is the shear modulus of elasticity:

for steel grade 40KhN G=81.000 MPa; $m_3$ is the weight of the axial thrust control unit 2 m long, 34 kg, $m_4 \ldots m_7$ are the weight of the coiled tubing, 28 mm diameter, 3.5 mm wall thickness, total length 14 m, weight 2 kg per 1 m, G is the shear modulus of elasticity: for steel grade 12Kh18N9T G=77,000 MPa; $m_8$ is the weight of a mud motor, type 2D 43.516.21 with two angle regulators, 2 m long, 18.7 kg, and a drill bit, 58 mm diameter, weight 0.5 kg (or a mill 71 mm-0.7 kg)).

$k_0, \ldots, k_8$ are dynamic stiffness values of the units included in a multimass assembly for perforation drilling, with the stiffness of separate tubing as spring systems determined according to V. E. Kapylov [15]:

$$k_i = \frac{E \cdot S_i}{l_i},$$

For example: dynamic stiffness of a 7-meter coiled tubing is $k_e$=5 N/m; dynamic stiffness of a 3.5-meter coiled tubing is $k_c$=2.5 N/m;

dynamic stiffness of a 10-meter rigid tubing is $k_r$=11.4 N/m; dynamic stiffness of a 7-meter rigid tubing is $k_r$=16.3 N/m;

Natural frequencies are determined with known equations:

$$\omega_{iC} = \sqrt{\frac{k_i}{m_i}}$$

are natural frequencies of tubing corresponding to weights $m_i$ as DSA oscillators;

where:
E is the Young modulus for rigid tubing (steel grade 40KhN . . . 40KhN2MA): E=(2.0 . . . 2.1)$10^5$ MPa;
for coiled tubing (steel 12Kh18N9T) depending on heat treatment: E=(1.3 . . . 1.9)$10^5$ MPa;
$S_i$ is the tubing cross-section, $m^2$;
$l_i$ is the length of the corresponding tubing part, m;
F(t) is the disturbing force (load on the drill bit);
c is the hydraulic resistance (damping coefficient) of the axial thrust control unit, determined with the equation:

$$c = \frac{5 \cdot \rho \cdot A \cdot \omega \cdot (d_1^2 - d_2^2)^2 \cdot \pi}{48 \cdot \mu^2 \cdot d_3^2}$$

For example, when: A is the amplitude of the ground-induced vibrations of the drill bit (such as: A=0.001 m):
$\omega$ is the circular frequency of the drill bit, $\omega$=125.6 $min^{-1}$;

$$\omega = \omega_2 \cdot K_c \cdot K_b = \frac{\pi \cdot n}{30} \cdot K_c \cdot K_b = \frac{3.14 \cdot 300}{30} \cdot 4 \cdot 1 = 125.6 \text{ min}^{-1}$$

$K_c$ is the number of cutters or wings for drill bits type PDC: we take $K_c$=4;
$K_b$ is the bits coefficient (according to V. P. Balitskiy), $K_b$=1;
$d_1$ is the diameter of the piston rod, $d_1$ =0.043 m;
$d_2$ is the diameter of the piston rod, $d_2$=0.034 m;
$d_3$ is the diameter of the choke, $d_3$=0.0012 . . . 0.0025 m;
$\mu$ is the coefficient of the fluid discharge from the axial thrust control unit, $\mu$=0.85.

Natural frequencies of the tubing may also be determined rather precisely for engineering calculations $$[15]: \omega_{iC} = \frac{5}{\sqrt{x_i}}$$

where $x_i$ is the linear deformation of the i tube in cm, and the natural frequency of the i tube $\omega_{iC}$ is expressed in Hz.

Figure 5:
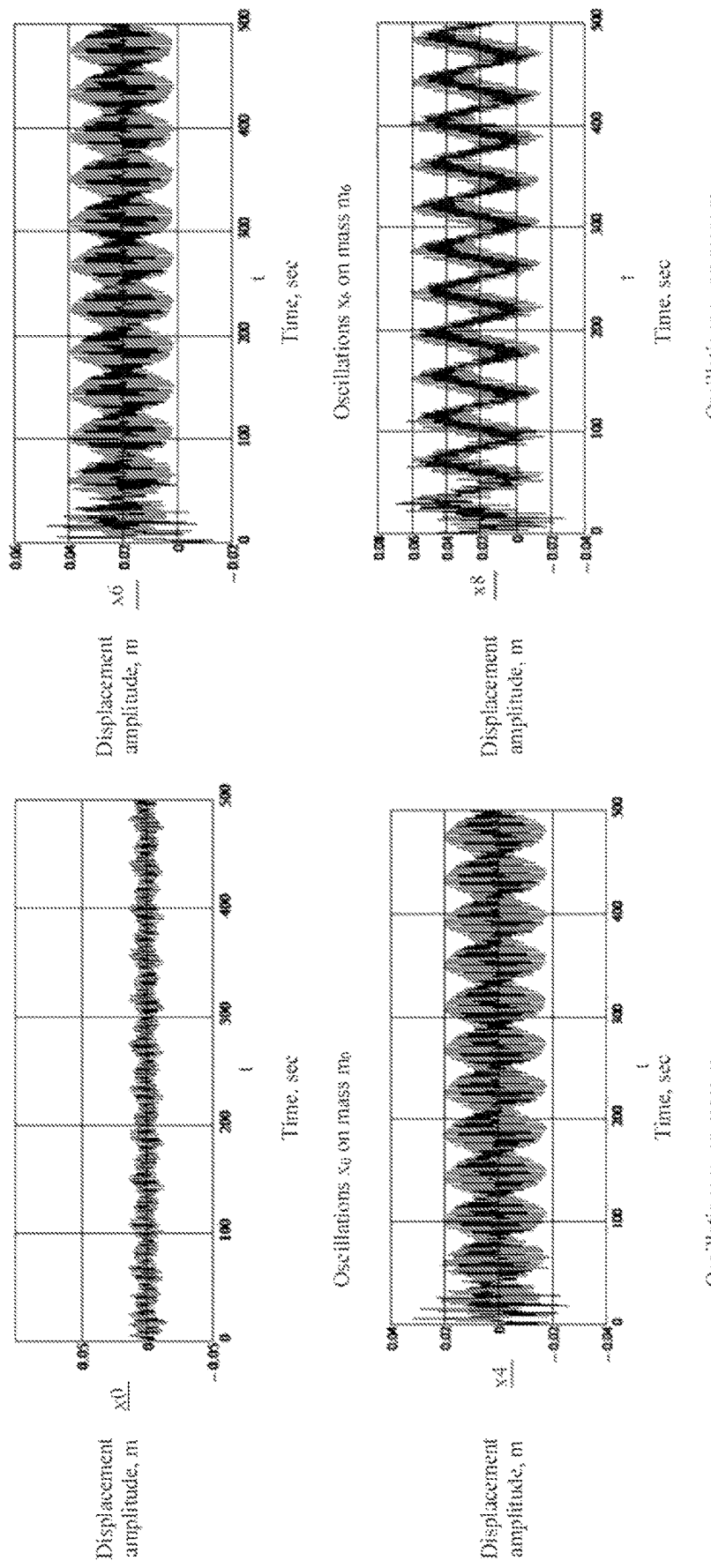
FIG. 5: trends of vibration speed displacement amplitudes and vibration acceleration for longitudinal, transverse and torsional vibrations when the assembly builds up oscillation during the drilling at the bench.
Figure 6:
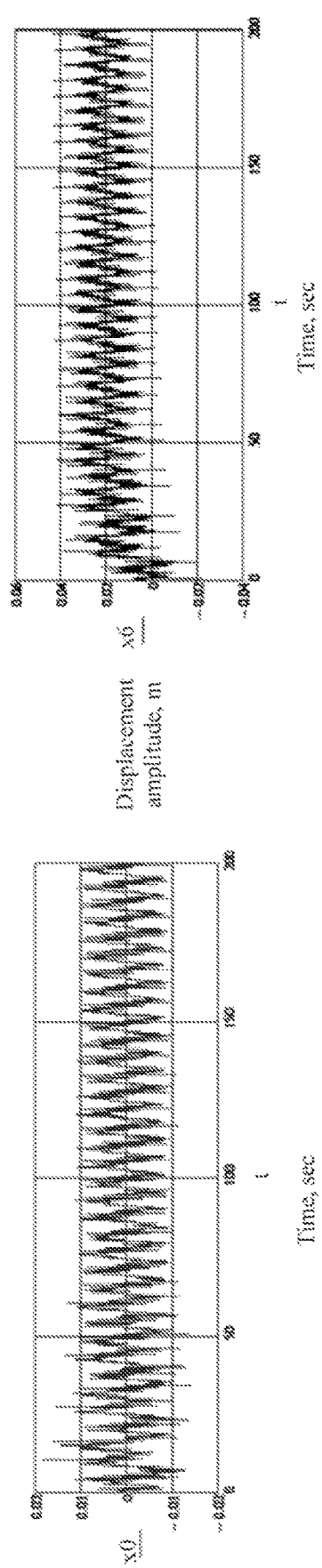
FIG. 6: displacement amplitude graphs.
Figure 6:
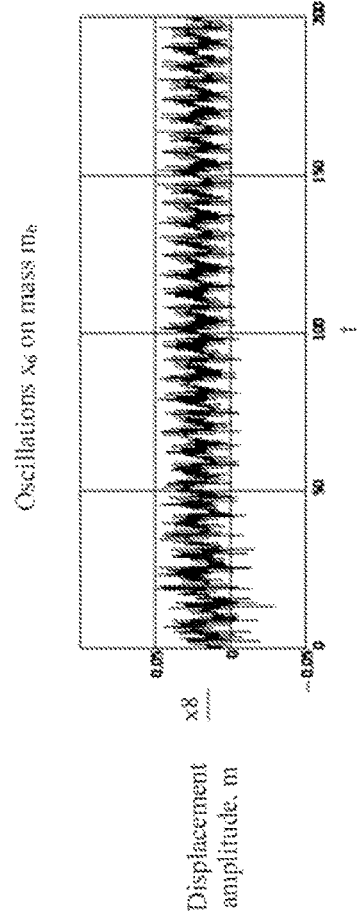
Figure 6:
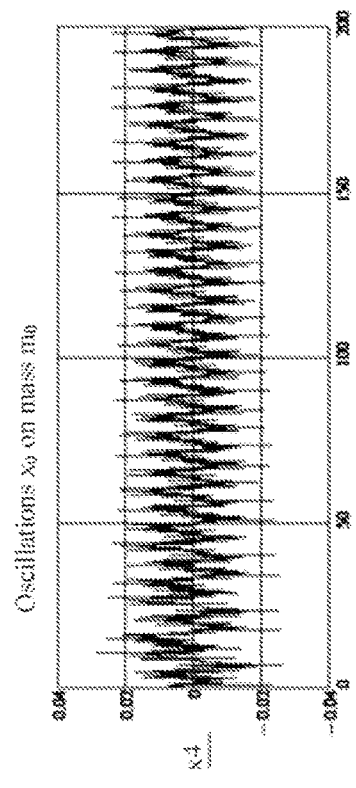

Thus, the measurements give us the amplitudes (displacement), vibration speed and vibration acceleration of the longitudinal, transverse and torsional vibrations of the DSA when drilling rocks of selected strength, and the trends of the wave motions of the oscillators having common group velocity $v_{GR}$ shown in FIGS. 5 and 6.

FIG. 5 shows the trends of vibration speed displacement amplitudes and vibration acceleration for longitudinal, transverse and torsional vibrations when the assembly builds up oscillation during the drilling at the bench for 58 mm 14 m channel.

Increased hydraulic resistance in the axial thrust control unit due to the $d_3$ diameter reduction from 25 mm (FIG. 5) to 12 mm, has led to vibration synchronization in the drilling assembly, which is proved by the graphs of displacement amplitude in FIG. 6.

Figure 7:
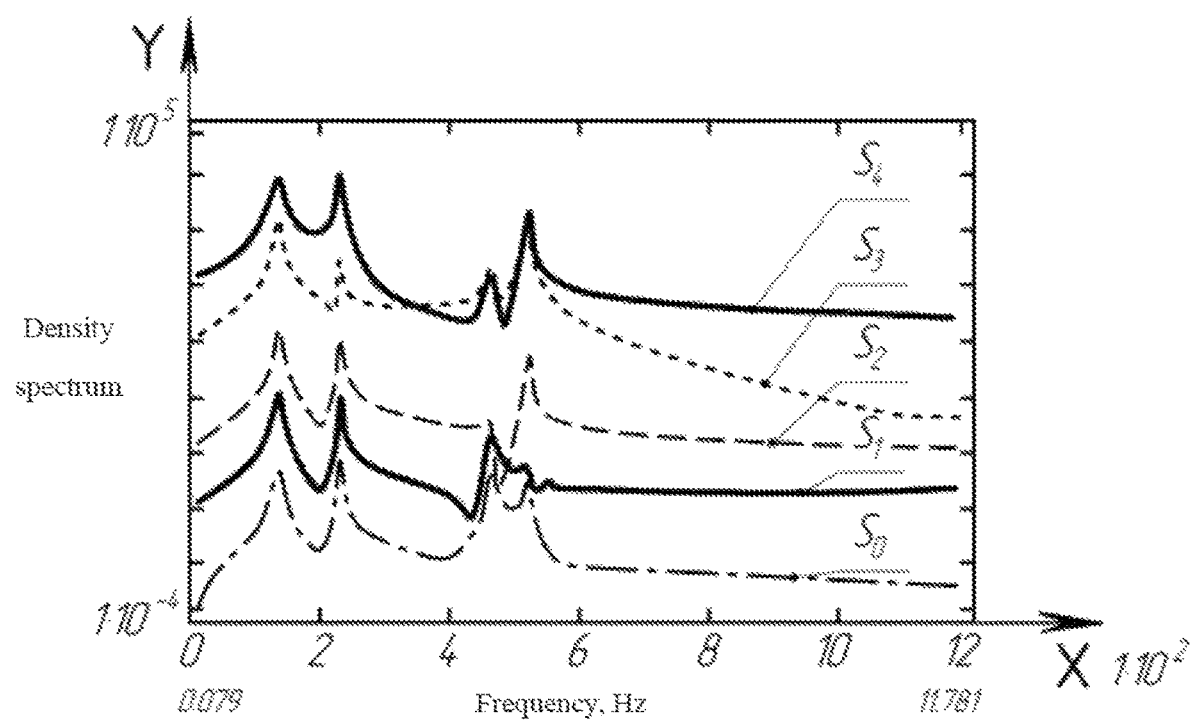
FIG. 7: spectral density graphs for analysed trends.

Then we conduct the spectral analysis of the obtained results shown in FIGS. 5 and 6, by calculating the spectral density of the assembly oscillators (graphs for the spectral densities of the analysed dependencies are shown in FIG. 7 (axis Y scale is semilogarithmical, axis X is for prevailing frequencies of the group wave process $W_P$ at a scale of $10^2$.

As a result, we have trajectories for operating elements positioned in a dynamic disturbance zone of the DSA in the phase plane. As seen in FIG. 7, there are four prevailing frequencies for the group wave process $W_P$: 170; 240; 450 and 530 Hz, around which the vibration energy of the operating units (DSA tubings with different weight $m_i$ and natural frequencies $\omega_{iC}$) is concentrated. Mean value of the wave process frequency is $W_P$=347 Hz, with period $T_P$=$2\pi$/347=0.0181 sec.

Figure 8:
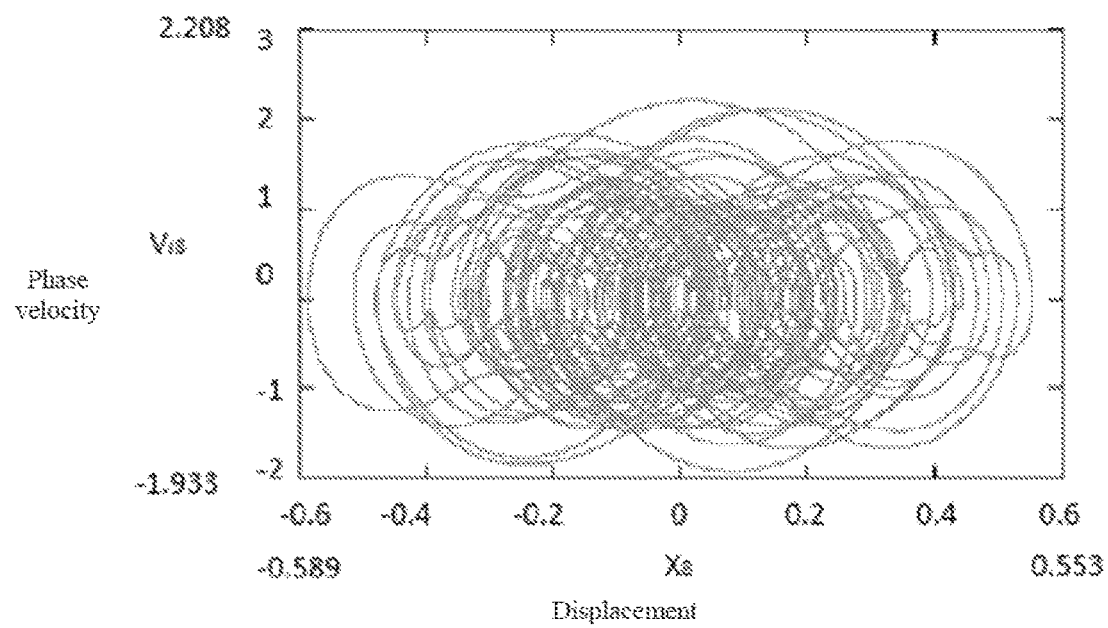
FIG. 8: phase trajectory of the drill bit.
Figure 9:
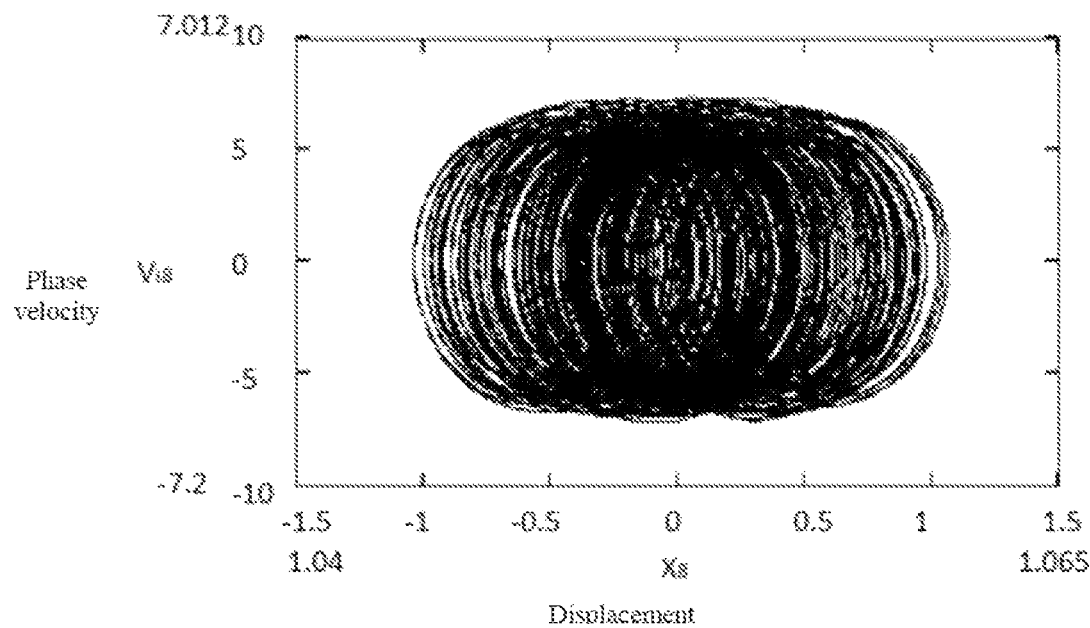
FIG. 9: phase trajectory of the drill bit and the mill.
Figure 10:
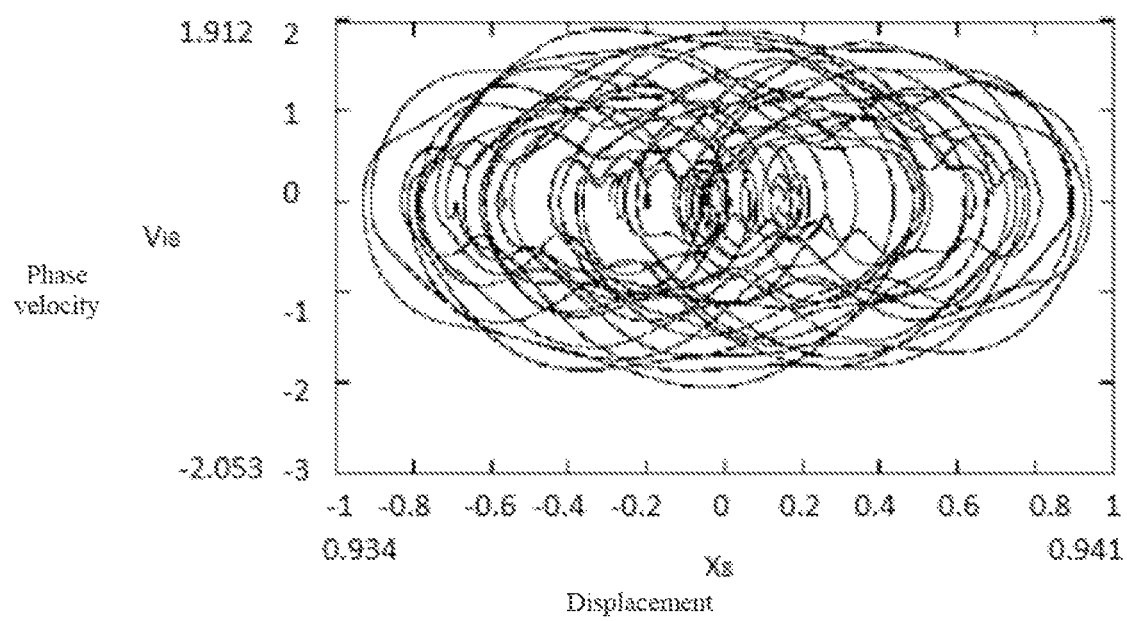
FIG. 10: phase trajectory of a small mud motor.
Figure 11:
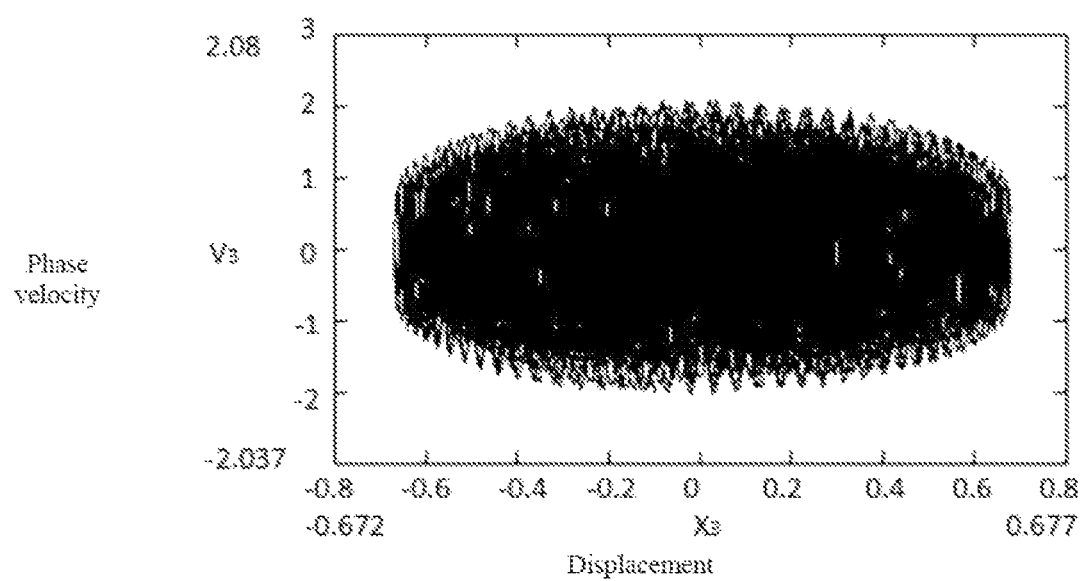
FIG. 11: phase trajectory of the axial thrust control unit.

FIGS. 1, 8-11 show the motion trajectories for oscillators within the DSA. Phase trajectories of the drill bit and the mill are shown in FIGS. 8 and 9 correspondingly, FIG. 10 shows the phase trajectory of the small mud motor and FIG. 11 shows the phase trajectory of the axial thrust control unit.

The results of the above-described DSA tests show that the spectral density $S_4$ shown in FIG. 7 is the most energy-intensive, as proves the corresponding phase trajectory of the axial thrust control unit in the "oscillation build-up" mode of the assembly when drilling a deep 14-meter-long channel to eliminate the possible sticking of tools.

As we see in FIG. 7, the prevailing frequencies of random vibrations of oscillators do not change, which means that the non-linear vibration mode is set.

The results of the analysis show that we have obtained certain synchronization in a number of partial oscillators, although the vibrations of separate oscillators are not synchronized overall; so, the described mode ("oscillation build-up") is suitable to avoid differential sticking.

The phase velocity of longitudinal vibrations of the DSA shown in FIG. 4 was $V_{PH1}$=5850 m/s for drilling a lime-cement block (example), with the probability of repetition $P_1$=0.95; the phase speed of transverse vibrations was $V_{PH2}$=3230 m/s with the probability $P_2$=0.45, and the phase speed of torsional vibrations was $V_{PH3}$=2970 m/s with the probability $P_3$=0.85. Then the group velocity $v_{GR}$, as a mean of random phase speed values, is the sum of products of obtained values and the probability of their occurrence, divided by their number $$(n): v_{GR} = \sum \frac{v_{PHi} \cdot P_i}{n} = 3178.5 \text{ m/sec.}$$

The geometric mean of the group velocity, without analysing the structure of the vibrations, is determined as follows:

$$V_{GR}^g = \sqrt[3]{V_{PH1} \cdot V_{PH2} \cdot V_{PH3}} = 3282.6 \text{ m/sec.}$$

The arithmetic mean of the group velocity for ungrouped data is:

$$V_{GR}^a = \frac{\sum_{i=3}^{3} V_{PHi}}{3} = 4016.6 \text{ m/sec}$$

Thus, the length of the dynamic disturbance zone of the DSA considering the stochastic nature of the process will be: $L_D = V_{GR} T_P/2 = 28.7$ m, and the optimum distance for positioning the axial thrust control unit, from the drill bit, will be: $L_D/2 = 14$ M.

Selecting the required parameters of the operating elements, such as natural frequencies ($\omega_{iC}$) considering different bending (EJ) and torsional (GJ) stiffness values, k, as dynamic stiffness values for coiled and rigid tubings, damping properties of the axial thrust control units (C), and their optimum placement in the dynamic stability points, the most favourable operation mode for the assembly and its elements can be found, and thus, the desired technical result can be achieved.

REFERENCES

1. V. O. Belorussov, Selection of the Bottom Hole Assemblies for Non-Oriented Well Drilling Abroad/V. O. Belorussov//Technique and Technology for Well Drilling/VNIIOENG—1988.—Issue. 8.—p. 39
2. V. F. Buslaev, Results of Using a Method for the Deviated Well Bore Trajectory Control to Change Their Azimuth/V. F. Buslaev//Drilling: RNTS/VNIIOENG. —1983.—No. 4.—P. 5-6.
3. STO 03-144-90. Guideline for drilling deviated cluster wells in Bashkiria. Valid from 01.06.90.—Ufa: BashNIPineft, 1990-61 pages
4. L. Ya. Sushon, Curvature Management for Deviated Wells in Western Siberia/L. Ya. Sushon, P. V. Emelyanov, R. T. Mullagaliev—M.: Nedra, 1988.—124 pages
5. V. G. Griguletskiy Bottom Hole Assembly Design/V. G. Griguletskiy, V. T. Lukyanov.—M.: Nedra, 1990.—302 pages
6. M. P. Gulizade, Regulating Azimuthal Deviation for Drilling Deviated Wells With Non-oriented BHA/M. P. Gulizade, O. K. Mamedbekov//Well Construction: RNTS/VNIIOENG.—1989.—Issue 1.—P. 6-8.
7. A. Sh. Yanturin, Advanced Methods of Operation and Drill String Mechanics/A. Sh. Yanturin.—Ufa: Bashknigoizdat, 1988.—168 pages.
8. A. Sh. Yanturin, On some aspects of practice and improvement of the drill string operation/A. Sh. Yanturin, R. R. Safiullin/Contemporary problems of drilling and oil production mechanics Ufa Petroleum Institute—Ufa 1986.—P. 46-50.
9. U.S. Pat. No. 2,147,669 Russian Federation METHOD OF DOWINHOLE DRILL STRING ASSEMBLY/I. E. Ishemguzhin, A. V. Lyagov, E. I. Ishemguzhin et al.— Publ. 2000, Bull. No. 11.
10. V. P. Balitskiy, To the Matter of Studying Natural Longitudinal Vibrations of a Drill String and its Resonance-Frequency Behaviour/V. P. Balitskiy/1 Machines and Petroleum Equipment: RNTS/VNIIOENG.— 1979.—No. 12.—P. 12-19.
11. V. P. Balitskiy, To the Matter of Bottomhole Parameters Monitoring for Turbo Drilling/V. P. Balitskiy 11 Automation and Teleautomation of Oil Industry: RNTS/VNIIO-ENG.—1976.—No. 8.—P. 7-11.
12. P. V. Balitskiy, Drill String Interaction with the Downhole/P. V. Balitskiy-M.: Nedra, 1975.—293 pages.
13. Vibrations in Engineering: guidebook in 6 vol./Edited by V. N. Chelomey.—M.: Mashinostroenie, 1978. Vol. 1 Linear system vibrations/Edited by V. V. Bolotin.— 1978.—352 pages
14. I. A. Lyagov, A. V. Lyagov, I. N. Suleymanov, M. A. Kachemaeva, Manufacturing of the Technical System "Perfobur" and Research of its Work in Channels with Small Radius of Curvature/Electronic scientific journal "Oil and Gas Business" 2015. No. 5. P. 45-105. URL: http://ogbus.ru/issues/5_2015/ogbus_5_2015_p45-105_LvagovIA_ru.pdf
15. Quick-release and elastic drill pipe connections: workbook for students, specialization 0211 "Oil and gas well drilling"/V. E. Kopylov, V. N. Artyushkin.-Tyumen: TSU 1983.-87 pages

The invention claimed is:
1. A method for drill string assembly as a technical dynamic system of connected oscillators for drilling branched channels of small diameter, including an assembly of operating components of various natural frequency positioned in a dynamically disturbed zone of the loaded part of the drill string,
wherein
a drill string assembly (DSA) including oscillators positioned as coupled units, a drill bit, a bearing section of the mud motor, power sections of the mud motor, rigid and coiled tubing assemblies with viscoelastic mechanical properties and different natural frequencies, and an axial load control unit, is mounted on a test bench
conducting tests following modeled programs of possible emergency and emergency-free operation modes for an assembly as a whole and its individual components,
measuring amplitude, vibration speed and vibration acceleration for longitudinal, transverse and torsional vibration are measured for drilling each kind of bed rock, trends for cumulative wave motion are obtained for oscillators moving with collective group speed,
analyzing said obtained values are analyzed to determine areas of dynamic stability at the test bench, displacement amplitude, determining vibration speed and vibration acceleration trends for longitudinal, transverse and torsional oscillations during test bench drilling,
conducting spectral analysis of the results, obtained by calculating of the spectral density of the operating components within the assembly; obtaining operating components trajectories for dynamic disturbance zone of the DSA in the phase plane,
determining the length of dynamically disturbed zone of the loaded part of a drill string based on the group velocity of the energy propagation for the monochromatic longitudinal, transverse and torsional waves batch, where waves differ in phase and frequency and propagate along the string with prevailing natural frequencies, different phase velocities at linear and non-linear, stochastic oscillations that appear in the drill string due to running out of the formed "dynamic stability points",
additionally, placing an axial thrust control unit in the "dynamic stability points", adapted to operate at various damping ratios, with its prevailing natural frequency obtained based on statistical processing of the spectral density values and phase trajectories,
selecting the required mode of operation for the assembly and its operation characteristics: natural frequencies considering different bending and torsional rigidity values, damping properties of the axial load control units and their optimum placement.

2. The method of claim 1, which includes calculating of the group velocity as a mathematical expectation of the obtained phase velocity values, with the weighing factor being the probability of the rate of registration of such values while the assembly is tested on the bench, and the mean value of the corresponding velocity as a random variable being equal to the sum of products of the random value and the probability of its occurrence, divided by their number.

3. The method of claim 1, which includes calculating of the group velocity as a geometric mean of the phase velocities of the longitudinal, transverse and torsional vibrations measured at the bench.

4. The method of claim 1, which includes calculating of the group velocity as an arithmetic mean, for a small difference in disturbing frequencies or for ungrouped data.

5. The method of claim 1, which includes the test bench equipped with amplitude, vibration speed and vibration acceleration gauges for longitudinal, transverse and torsional vibrations of the assemblies when drilling rocks of various strength selected from the following: lime, dolomite, granite, marble or lime-cement block made according to API 19B.

* * * * *